(12) United States Patent
Buttgenbach

(10) Patent No.: US 11,848,560 B2
(45) Date of Patent: Dec. 19, 2023

(54) NETWORKED POWER PLANTS

(71) Applicant: 8me Nova, LLC, El Dorado Hills, CA (US)

(72) Inventor: Thomas Buttgenbach, Santa Monica, CA (US)

(73) Assignee: 8ME NOVA, LLC, El Dorado Hills, CA (US)

(*) Notice: Subject to any disclaimer, the term of this patent is extended or adjusted under 35 U.S.C. 154(b) by 0 days.

(21) Appl. No.: 18/119,067

(22) Filed: Mar. 8, 2023

(65) Prior Publication Data

US 2023/0369866 A1 Nov. 16, 2023

Related U.S. Application Data

(63) Continuation of application No. 17/742,980, filed on May 12, 2022, now Pat. No. 11,611,217.

(51) Int. Cl.
*H02J 3/38* (2006.01)
*H02J 3/00* (2006.01)

(52) U.S. Cl.
CPC ............... *H02J 3/381* (2013.01); *H02J 3/004* (2020.01); *H02J 2203/10* (2020.01); *H02J 2300/22* (2020.01); *H02J 2300/28* (2020.01); *H02J 2300/40* (2020.01)

(58) Field of Classification Search
CPC ........ H02J 3/381; H02J 3/004; H02J 2300/22; H02J 2300/28; H02J 2300/40; H02J 2203/10
USPC .......................................................... 307/43
See application file for complete search history.

(56) References Cited

U.S. PATENT DOCUMENTS

| | | |
|---|---|---|
| 9,438,041 B2 | 9/2016 | Roy et al. |
| 9,945,264 B2 | 4/2018 | Wichmann et al. |
| 10,331,089 B2 | 6/2019 | Khabibrakhmanov et al. |
| 10,756,543 B2 | 8/2020 | Detmers et al. |
| (Continued) | | |

FOREIGN PATENT DOCUMENTS

CN 112086998 A 12/2020

OTHER PUBLICATIONS

"Guide to Purchasing Green Power, Renewable Electricity, Renewable Energy Certificates, and On-Site Renewable Generation", Office of Air (6202J) EPA430-K-04-015 www.epa.gov/greenpower Mar. 2010 Updated: Sep. 2018, downloaded Jul. 26, 2022.

*Primary Examiner* — Daniel Kessie
*Assistant Examiner* — Dru M Parries
(74) *Attorney, Agent, or Firm* — Foley & Lardner LLP

(57) ABSTRACT

A method described delivers power to a first load and a second load from networked power plants. The method may include receiving a power delivery profile for the first load, receiving a power delivery profile for a second load, determining a power output capability of a first renewable energy power plant (REPP), and determining a power output capability of a second REPP. The method may also include setting a power output for the first REPP and a power output for the second REPP based on the power delivery profile for the first and second loads and the power output capabilities of the first and second REPPs. The method may also include allocating a combined power output of the first and second REPPs to the first and second loads and delivering the allocated combined power output to the first and second loads.

21 Claims, 11 Drawing Sheets

(56) References Cited

U.S. PATENT DOCUMENTS

| | | |
|---|---|---|
| 11,063,554 B1 | 7/2021 | Hansen et al. |
| 11,381,090 B2 | 7/2022 | Srinivasan et al. |
| 2010/0293045 A1 | 11/2010 | Burns et al. |
| 2011/0276269 A1 | 11/2011 | Hummel |
| 2014/0200723 A1 | 7/2014 | Roy et al. |
| 2016/0172859 A1 | 6/2016 | Marhoefer |
| 2017/0014449 A1 | 1/2017 | Bangera et al. |
| 2017/0331292 A1 | 11/2017 | Rive et al. |
| 2017/0358929 A1* | 12/2017 | Koeppe .................... H02J 1/08 |
| 2018/0210976 A1* | 7/2018 | Goyal ..................... G06F 30/20 |
| 2021/0285415 A1 | 9/2021 | Vamvas |

\* cited by examiner

NETWORKED POWER PLANTS

CROSS-REFERENCE TO RELATED APPLICATIONS

This application is a continuation of U.S. application Ser. No. 17/742,980 titled "Networked Power Plants" filed May 12, 2022, which application is hereby incorporated by reference in its entirety.

BACKGROUND

Renewable energy power plants (REPPs) often have inconsistent or intermittent power outputs due to the nature of renewable energy generation. Solar power plants receive variable amounts of sunlight based on the time of day, seasonal cycles and weather patterns. Wind power plants receive variable amounts of wind based on weather patterns and a variety of other factors. Intermittent power delivery, however, is incompatible with loads or grid systems that balance load and production on a real time basis. What is needed is more reliable power delivery from REPPs.

SUMMARY

Aspects of one embodiment of the present disclosure relate to a method including receiving a power delivery profile for a first load, receiving a power delivery profile for a second load, determining a power output capability of a first renewable energy power plant (REPP), and determining a power output capability of a second REPP. The method may also include setting a power output for the first REPP and a power output for the second REPP based on the power delivery profile for the first and second loads and the power output capabilities of the first and second REPPs. The method may also include allocating a combined power output of the first and second REPPs to the first and second loads and delivering the allocated combined power output to the first and second loads.

The method may include wherein the power output of the first REPP has a first variability, the power output of the second REPP has a second variability, and the combined power output has a third variability, wherein the third variability is lower than the first variability and the second variability.

The method may include wherein the combined power output is able to satisfy the power delivery profiles of the first and second loads more often than the power outputs of the first and second REPPs when not combined. The method may include wherein the power output capabilities of the first and second REPPs are such that the power output of the first REPP does not satisfy the first power delivery profile above a first threshold reliability and the power output of the second REPP does not satisfy the second power delivery profile above a second threshold reliability, wherein the combined power output satisfies the first and second power delivery profiles above the first and second threshold reliabilities.

The method may include wherein allocating the combined power output to the first and second loads comprises allocating a first portion of the power output of the first REPP to the first load and a second portion of the power output of the first REPP to the second load.

The method may include communicating to the first load a first amount of power delivered to the first load and communicating to the second load a second amount of power delivered to the second load.

Aspects of one embodiment of the present disclosure relate to a system including a controller. The controller may be configured to receive a power delivery profile for a first load, receive a power delivery profile for a second load, determine a power output capability of a first renewable energy power plant (REPP), and determine a power output capability of a second REPP. The controller may be configured to set a power output for the first REPP and a power output for the second REPP based on the power delivery profile for the first and second loads and the power output capabilities of the first and second REPPs. The controller may be configured to allocate a combined power output of the first and second REPPs to the first and second loads and direct the first and second REPP to deliver the allocated combined power output to the first and second loads.

The system may include wherein the power output of the first REPP has a first variability, the power output of the second REPP has a second variability, and the combined power output has a third variability, wherein the third variability is lower than the first variability and the second variability. The system may include wherein the power output capabilities of the first and second REPPs are such that the power output of the first REPP does not satisfy the first power delivery profile above a first threshold reliability and the power output of the second REPP does not satisfy the second power delivery profile above a second threshold reliability, wherein the combined power output satisfies the first and second power delivery profiles above the first and second threshold reliabilities.

The system may include wherein allocating the combined power output to the first and second loads comprises allocating a first portion of the power output of the first REPP to the first load and a second portion of the power output of the first REPP to the second load.

The system may include wherein the allocated combined power output is delivered to the first and second loads via a grid. The system may include wherein the controller is further configured to communicate to the first load a first amount of power delivered to the first load and communicate to the second load a second amount of power delivered to the second load.

Aspects of one embodiment of the present disclosure relate to a non-transitory computer-readable storage medium having instructions stored thereon that, upon execution by a processor, cause the processor to perform operations including receiving a power delivery profile for a first load, receiving a power delivery profile for a second load, determining a power output capability of a first renewable energy power plant (REPP), and determining a power output capability of a second REPP. The operations may also include setting a power output for the first REPP and a power output for the second REPP based on the power delivery profile for the first and second loads and the power output capabilities of the first and second REPPs. The operations may also include allocating a combined power output of the first and second REPPs to the first and second loads and delivering the allocated combined power output to the first and second loads.

The non-transitory computer-readable storage medium may also include wherein the power output of the first REPP has a first variability, the power output of the second REPP has a second variability, and the combined power output has a third variability, wherein the third variability is lower than the first variability and the second variability. The non-transitory computer-readable storage medium may include wherein the combined power output is able to satisfy the power delivery profiles of the first and second loads more often than the power outputs of the first and second REPPs when not combined. The non-transitory computer-readable storage medium may also include wherein the power output capabilities of the first and second REPPs are such that the power output of the first REPP does not satisfy the first power delivery profile above a first threshold reliability and the power output put the second REPP does not satisfy the second power delivery profile above a second threshold reliability, wherein the combined power output satisfies the first and second power delivery profiles above the first and second threshold reliabilities.

The non-transitory computer-readable storage medium may also include wherein allocating the combined power output to the first and second loads comprises allocating a first portion of the power output of the first REPP to the first load and a second portion of the power output of the first REPP to the second load.

The non-transitory computer-readable storage medium may also include wherein the allocated power is delivered to the first and second loads via a grid. The operations may further include communicating to the first load a first amount of power delivered to the first load and communicating to the second load a second amount of power delivered to the second load.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
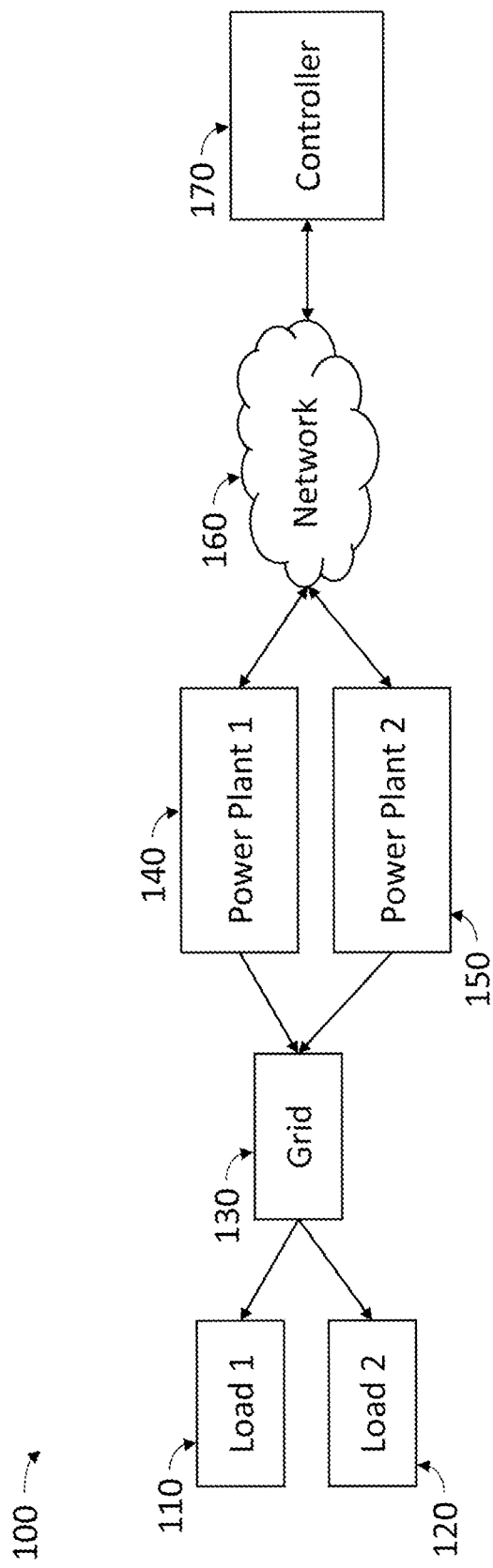
FIG. 1 illustrates an example environment in accordance with one or more embodiments.

Embodiments of the present disclosure allow an operator of networked REPPs to deliver power with greater reliability. Combining the outputs of REPPs whose outputs are not entirely correlated results in a combined output with a variability and intermittency lower than the variabilities and intermittencies of the outputs of the individual REPPs. This means that power can be delivered more consistently by networked REPPs than by individual REPPs. Additionally, some load operators may want to use only renewable energy but may require consistent power delivery. These load operators may want to receive power over a grid and only use renewable energy. These load operators may correlate their power usage with renewable power production in order to only use renewable energy. These load operators may send a power delivery profile to a renewable energy source representing a request for amounts of renewable power production at different times. If the power delivery profile of a load is satisfied, the load operator can claim to only use renewable energy for the load. The REPP output allocated to a load may be thought of as an overlay on top of the rest of the power delivered on the grid because it is considered to be produced at the REPP and delivered to the load, ignoring the inevitable commingling of power on the grid from different sources. The output is effectively produced at the REPP and delivered to the load, despite the inevitable commingling of power on the grid from different sources To consistently satisfy the power delivery profile, consistent power delivery is required. Individual REPPs may struggle to provide consistent power delivery. This means that some loads may have to use some power from non-renewable power sources or the REPP may have to have a power capacity greatly exceeding the power delivery profile of a load in order to consistently satisfy the load's power delivery profile despite fluctuations in power generation. Networked REPPs may be able to provide more-consistent power that comes entirely from renewable power sources. Additionally, and/or alternatively, each REPP may have a power capacity lower than what would be needed for a single REPP to provide consistent power. Each REPP having a lower power capacity than what a single, un-networked REPP would need to provide consistent power results in increases in efficiency and lower costs for constructing REPPs due to each REPP needing less excess capacity which would usually not be fully utilized. Networked REPPs may also produce power in excess of what is required by various loads. This excess power may be treated as a virtual REPP, or virtual power plant which can deliver power to additional loads.

The outputs of networked REPPs and virtual power plants may be delivered over the grid and allocated to various loads. This allocated combined output of networked REPPs may be thought of as an overlay on top of the rest of the power delivered on the grid because it is effectively produced at the networked REPPs and delivered to the various loads to which it is allocated, ignoring the inevitable commingling of power on the grid from different sources. This overlay may be treated as a green grid, utilizing the existing infrastructure of the grid, but delivering renewable power from REPPs to the various loads. The green grid may function similar to the grid on which it operates, with a market for renewable power distinct from a market for conventional power. The green grid may be owned and operated by one entity, or it may include REPPs owned and operated by a variety of entities.

FIG. 1 illustrates an example environment 100 in accordance with one or more embodiments. The environment 100 may include a first load 110, a second load 120, a grid 130, a first power plant 140, a second power plant 150, a network 160, and a controller 170. The first load 110 and the second load 120 may be electrically coupled to the grid 130. The first load 110 and the second load 120 may be remote from each other and have separate power requirements. The first load 110 may have a first power delivery profile which details power requirements for the first load 110 at different times. The second load 120 may have a second power delivery profile which details power requirements for the second load 120 at different times. In some embodiments, the grid 130 may be a utility grid owned and operated by a single utility or system operator. In other embodiments, the grid 130 may be a plurality of electrical connections allowing for the transmission of power from the first power plant 140 and the second power plant 150 to the first load 110 and the second load 120.

The first power plant 140 may be a first renewable energy power plant (REPP). The second power plant 150 may be a second REPP. Examples of REPPs include, but are not limited to, solar plants, wind plants, geothermal plants, and biomass plants. REPPs may include energy storage systems (ESSs). An example of an ESS is a battery. A battery-based ESS may be called a batter ESS or BESS. The first power plant 140 may have a first power output that varies over time. The second power plant 150 may have a second power output that varies over time. The first power output and the second power output may vary differently such that they are not tightly correlated. For example, the first power plant 140 may be geographically remote from the second power plant 150 such that weather patterns at the first power plant 140 differ from weather patterns at the second power plant 150. Thus, variation in the first power output will not be tightly correlated with variation in the second power output. The less correlated the output of the first power plant 140 with the output of the second power plant 150, the greater the effects of networking. The less correlated the outputs of the first power plant 140 and the second power plant 150, the less variation will be present in the combined output of the first power plant 140 and the second power plant 150. Less variation in the combined output may result in more reliability in satisfying the power delivery profiles of the first load 110 and the second load 120. Less variation in the combined output may result in lower capacity requirements for the first power plant 140 and the second power plant 150.

In some embodiments, the first power plant 140 and the second power plant 150 may be selected to be networked. The first power plant 140 and the second power plant 150 may be selected for networking based on a level of correlation between the first power output and the second power output. The first power plant 140 and the second power plant 150 may be selected for networking based on a determination that the first power output and the second power output are the least correlated of a plurality of power outputs of a plurality of power plants. In some embodiments, the first power output is compared to a plurality of power outputs to select the second power output which is the least correlated with the first power output of the plurality of power outputs. In other embodiments, the first power plant 140 and the second power plant 150 may be selected by optimizing for minimized correlation from a plurality of power plants. The controller 170 may select the first power plant 140 and the second power plant 150. In some embodiments, the plurality of power outputs are available power outputs of a plurality of power plants. For example, a first power output may be less correlated with a second power output than with a third power output, but if the second power output is unavailable, the first and third power outputs may be selected for networking.

Similar network advantages may be realized by selecting loads with power requirements that are not tightly correlated. For example, a combined power delivery profile of two loads will have less variability than the individual power delivery profiles of the two loads if the individual power delivery profiles are not tightly correlated. Less variability in the combined power delivery profile allows for the combined power delivery profile to be served by a power plant or network of power plants having less excess capacity.

The first power plant 140 and the second power plant 150 may communicate with a controller 170 via a network 160. The network 160 may be any local area network (LAN) or wide area network (WAN). In some embodiments, the network is the internet. In other embodiments, the network is a private communications network. The controller may include a processor and a memory.

The controller 170 may control the first power plant 140 and the second power plant 150. The controller 170 may coordinate the first power output of the first power plant 140 and the second power output of the second power plant 150 in order to deliver power to the first load 110 and the second load 120. The controller 170 may receive the first power delivery profile of the first load 110 and the second power delivery profile of the second load 120. In some embodiments, the controller 170 receives the first power delivery profile from the first load 110 and the second power delivery profile from the second load 120 via the network 160. In other embodiments, the controller 170 receives the first power delivery profile and the second power delivery profile from another source. The controller 170 may direct the first power plant 140 to direct power to the first load 110 or the second load 120. The controller 170 may direct the second power plant 150 to direct power to the first load 110 or the second load 120. The controller 170 may direct the first power plant 140 to direct a first portion of its power output to the first load 110 and a second portion of its power output to the second load 120. The controller 170 may direct the second power plant 150 to direct a third portion of its power output to the first load 110 and a fourth portion of its power output to the second load 120. In some embodiments, directing power from a power plant to a load is accomplished by sending power from the power plant to the grid and communicating to the load how much power was sent to the grid. The load draws power from the grid equal to how much power the power plant sent to the grid. The load may match its energy consumption in a time window to the energy sent from the power plant to the grid in the time window. The time window may be a year, a month, a day, an hour, a minute, or any other unit of time. Where power is directed to the load from multiple power plants, the load may match its power consumption in a time window to the total power sent by the multiple power plants in the time window. Where the load needs to consume more energy than the total energy sent by the multiple power plants in the time window, the load operator may draw energy from other sources (which may not be renewable) and keep a record of the portion of energy consumed from the multiple power plants and from the other sources respectively, as input to an algorithm that will adjust its future requests for energy from the multiple power plants.

The controller 170 may direct the first power plant 140 and the second power plant 150 to direct power to the first load 110 and the second load 120 to satisfy the first power delivery profile and the second power delivery profile. If the power output of the first power plant 140 is sufficient to satisfy the first power delivery profile of the first load 110 and the power output of the second power plant 150 is sufficient to satisfy the second power delivery profile of the second load 120, the controller 170 may direct the first power plant 140 to direct sufficient power to the first load 110 to satisfy the first power delivery profile and direct the second power plant 150 to direct sufficient power to the second load 120 to satisfy the second power delivery profile. If the power output of the first power plant 140 is insufficient to satisfy the first power delivery profile of the first load 110 and the power output of the second power plant 150 is sufficient to satisfy the second power delivery profile of the second load 120, the controller 170 may direct the first power plant 140 to direct its power output to the first load 110 and direct the second power plant 150 to direct sufficient power to the second load 120 to satisfy the second power delivery profile and an amount of power to the first load 110 sufficient, when combined with the power output of the first power plant 140, to satisfy the first power delivery profile of the first load 110. Since the power outputs of the first power plant 140 and the second power plant 150 are not correlated, it is likely that if the power output of the first power plant 140 is insufficient to satisfy the first power delivery profile, the second power plant 150 has sufficient power output in excess of what is require by the second power delivery profile to supplement the power output of the first power plant 140 to satisfy the first power delivery profile.

Figure 2:
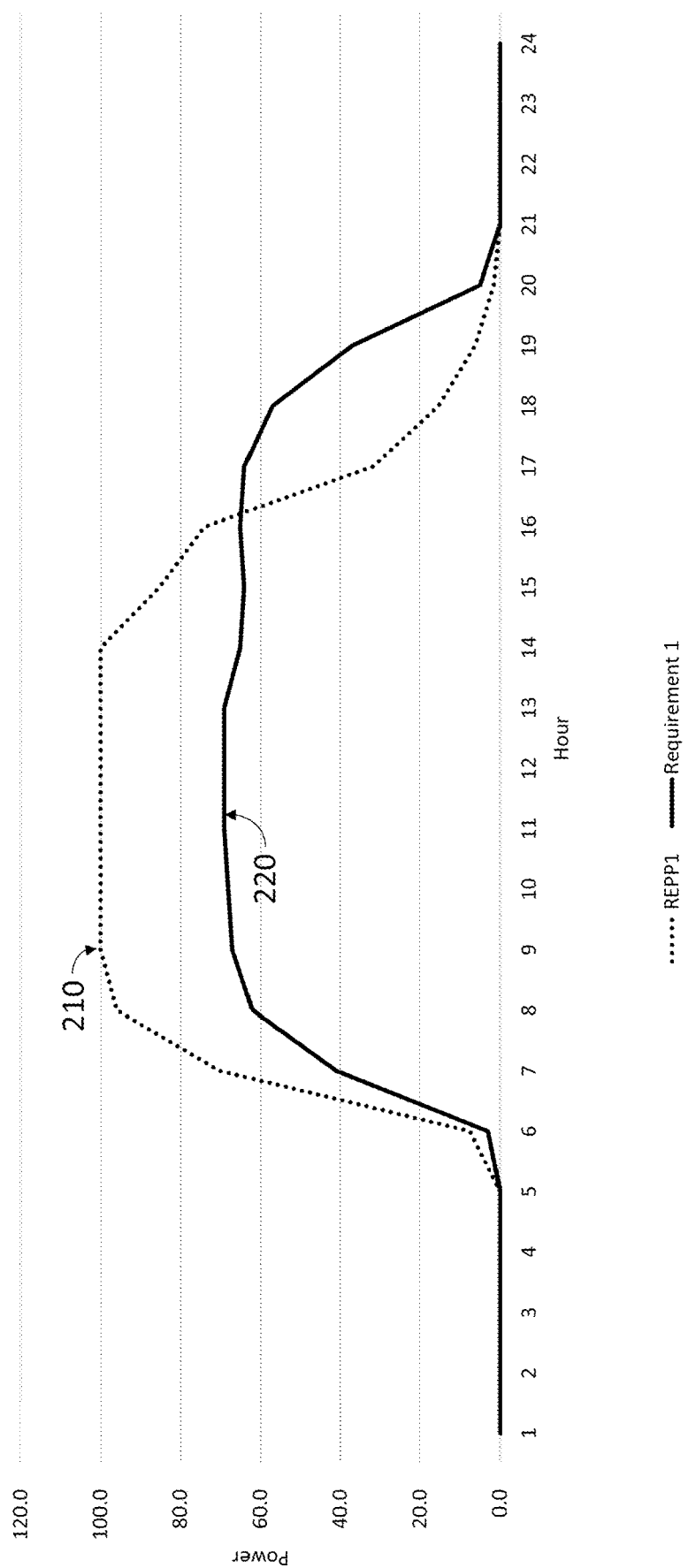
FIG. 2 illustrates a first renewable energy power plant (REPP) output and a first power delivery profile.

FIG. 2 illustrates a first renewable energy power plant (REPP) output 210 and a first power delivery profile 220. The first REPP output 210 is shown by the dotted line and the first power delivery profile 220 is shown by the solid line. The first REPP output 210 may be the power output of the first power plant 140 of FIG. 1 and the first power delivery profile 220 may be the first power delivery profile of the first load 110 of FIG. 1. The first power delivery profile 220 represents the power requirements of the first load 110. The first REPP output 210 varies over time. When the first REPP output 210 is greater than the first power delivery profile 220, the first REPP output 210 satisfies the first power delivery profile 220. The first REPP output 210 satisfies the first power delivery profile 220 for twenty of twenty-four hours, meaning the first REPP output 210 satisfies the first power delivery profile 220 83% of the time. The first power plant 140 may be 83% reliable based on the first REPP output 210 satisfying the first power delivery profile 220 of the first load 110 83% of the time.

The first load 110 may require that the first power plant 140 satisfy the first power delivery profile 220 for a number of hours or be reliable above a threshold reliability. The first REPP output 210 may have a maximum value much greater than a maximum value of the first power delivery profile 220 in order to ensure the first power plant 140 is reliable above the threshold reliability. The maximum value of the first REPP output 210 much greater than the maximum value of the first power delivery profile 220 may be necessary to ensure the first power delivery profile 220 is satisfied given variation in the first REPP output 210.

Figure 3:
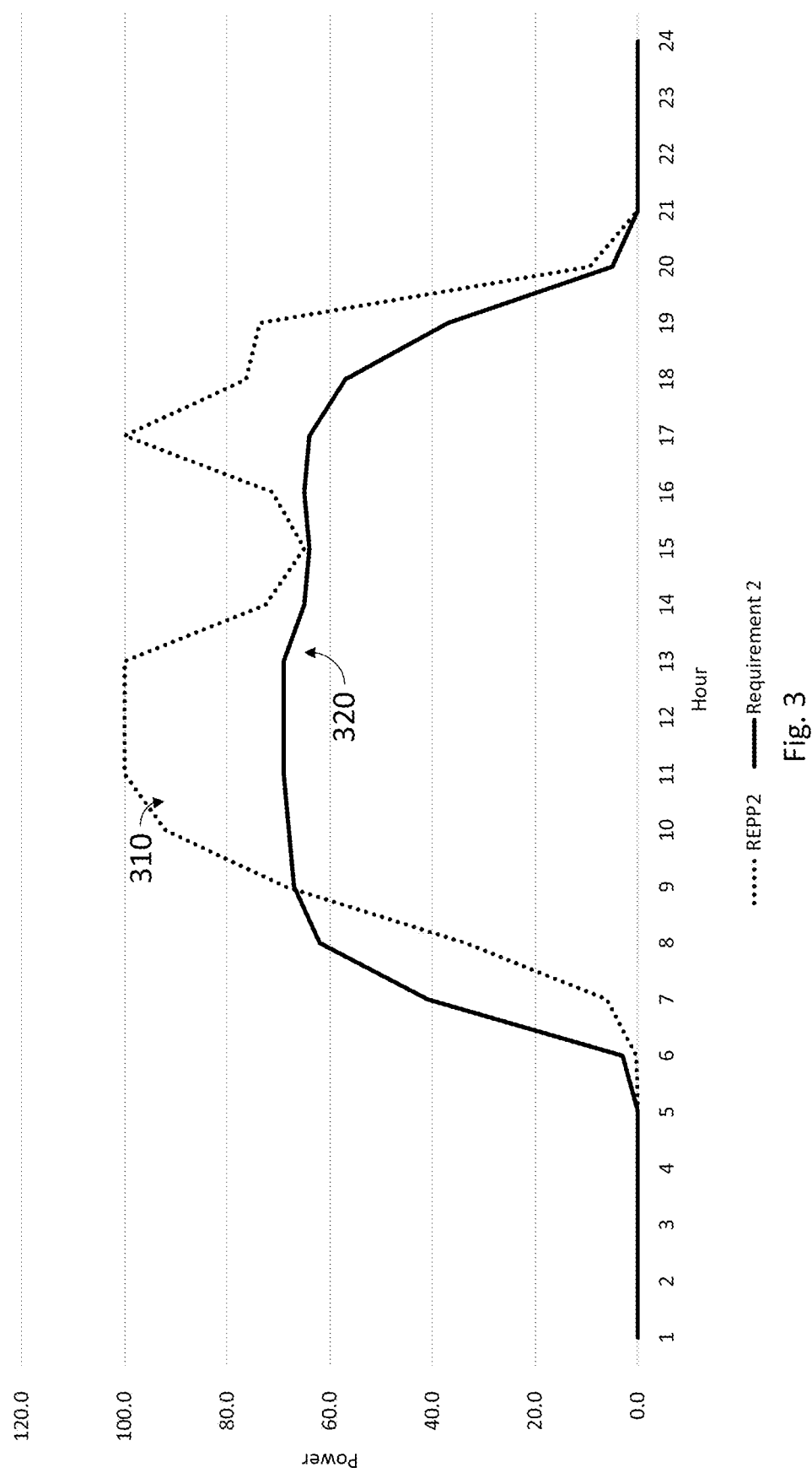
FIG. 3 illustrates a second REPP output and a second power delivery profile.

FIG. 3 illustrates a second REPP output 310 and a second power delivery profile 320. The second REPP output 310 is shown by the dotted line and the second power delivery profile 320 is shown by the solid line. The second REPP output 310 may be the power output of the second power plant 150 of FIG. 1 and the second power delivery profile 320 may be the second power delivery profile of the second load 120 of FIG. 1. While FIG. 2 illustrates the second power delivery profile 320 as being the same as the first power delivery profile 220, the first power delivery profile 220 and the second power delivery profile 320 may be different. The second power delivery profile 320 represents the power requirements of the second load 120. The second REPP output 310 varies over time. When the second REPP output 310 is greater than the second power delivery profile 320, the second REPP output 310 satisfies the second power delivery profile 320. The second REPP output 310 satisfies the second power delivery profile 320 for twenty of twenty-four hours, meaning the second REPP output 310 satisfies the second power delivery profile 320 83% of the time. The second power plant 150 may be 83% reliable based on the second REPP output 310 satisfying the second power delivery profile 320 of the second load 120 83% of the time.

The second load 120 may require that the second power plant 150 satisfy the second power delivery profile 320 for a number of hours or be reliable above a threshold reliability. The second REPP output 310 may have a maximum value much greater than a maximum value of the second power delivery profile 320 in order to ensure the second power plant 150 is reliable above the threshold reliability. The maximum value of the second REPP output 310 much greater than the maximum value of the second power delivery profile 320 may be necessary to ensure the second power delivery profile 320 is satisfied given variation in the second REPP output 310.

Figure 4:
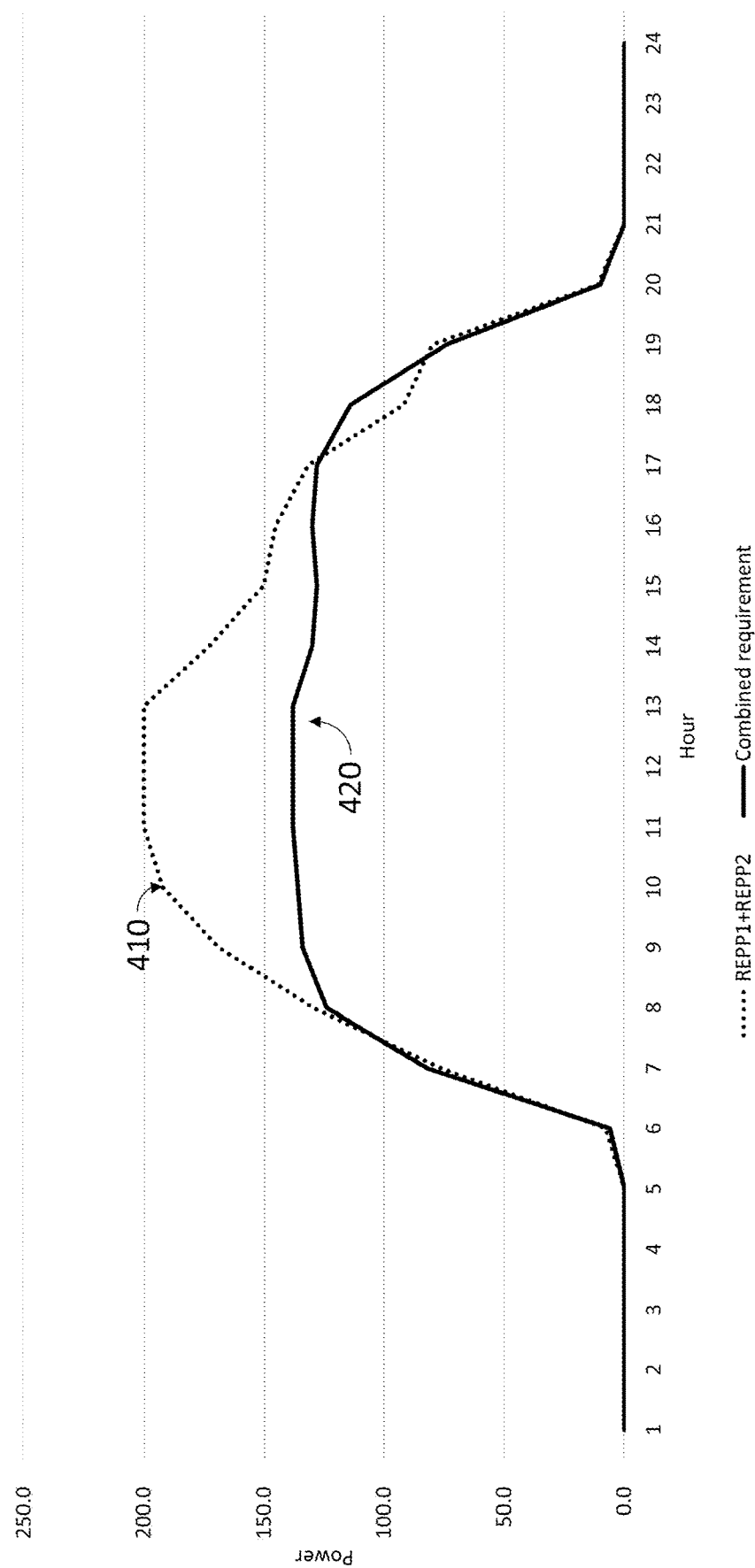
FIG. 4 illustrates a combined REPP output and a combined power delivery profile.

FIG. 4 illustrates a combined REPP output 410 and a combined power delivery profile 420. The combined REPP output 410 represents a combination of the first REPP output 210 and the second REPP output 310. The combined power delivery profile 420 represents a combination of the first power delivery profile 220 and the second power delivery profile 320. The combined REPP output 410 satisfies the combined power delivery profile 420 twenty-two of twenty-four hours, or 92% of the time. This means that the combined REPP output 410 is more reliable than the first power plant 140 and the second power plant 150. This is because the first REPP output 210 and the second REPP output 310 are not exactly correlated, so there is less variability in the combined REPP output 410 than in the first REPP output 210 and the second REPP output 310. The combined REPP output 410 can satisfy the power delivery profiles of the first load 110 and the second load 120 more often than the first REPP output 210 and the second REPP output 310 when not combined. This means that the first load 110 and the second load 120 can more reliably receive power from the first power plant 140 and the second power plant 150.

For example, if operators of the first load 110 and the second load 120 want to use only renewable power, the first load 110 can specify its power needs in the first power delivery profile 220 and the second load 120 can specify its power needs in the second power delivery profile 320. If the first load 110 receives power only from the first power plant 140, then the first power delivery profile 220 is only satisfied 83% of the time and the first load 110 can only claim that it uses exclusively renewable power 83% of the time. The other 17% of the time, the power needs of the first load 110 must be met using other power sources connected to the grid 130. Similarly, if the second load 120 receives power only from the second power plant 150, then the second power delivery profile 320 is only satisfied 83% of the time and the second load 120 can only claim that it uses exclusively renewable power 83% of the time. The other 17% of the time, the power needs of the second load 120 must be met using other power sources connected to the grid 130. However, if the first power plant 140 and the second power plant 150 are networked and are controlled by the controller 170 via the network 160, the controller 170 can direct the combined REPP output 410 to satisfy the combined power delivery profile 420 92% of the time. This means that both the first load 110 and the second load 120 can claim that they use only renewable power 92% of the time if the combined REPP output 410 is allocated equally between the first load 110 and the second load 120. The controller 170 may also allocate the combined REPP output 410 unequally between the first load 110 and the second load 120 such that the first power delivery 220 profile is satisfied more than 92% of the time and the second power delivery profile 320 is satisfied less than 92% of the time. Allocating the combined REPP output 410 between the first load 110 and the second load 120 may include notifying the first load 110 of an amount of power allocated to the first load and notifying the second load 120 of an amount of power allocated to the second load. Allocating the combined REPP output 410 between the first load 110 and the second load 120 may include allocating a first portion of the power output of the first power plant 140 to the first load 110 and allocating a second portion of the power output of the second power plant 150 to the second load 120. The controller may store configurations of power allocation in the memory of the controller 170. The controller may store a record of amounts of power delivered by the first power plant 140 and the second power plant 150 in the memory of the controller 170.

Networking the first power plant 140 and the second power plant 150 using the controller 170 may be used to lower the initial capital expenditures of the first power plant 110 and the second power plant 150. For example, if a reliability of 83% is all that is required by the first load 110 and the second load 120, then, when networked together, the first power plant 140 and the second power plant 150 may be built with less excess capacity than is required to by 83% reliable. The first power plant 140 may have an excess capacity over the maximum value of the first power delivery profile 220 such that the first power plant 140 is 70% reliable. Similarly, the second power plant 150 may have an excess capacity over the maximum value of the second power delivery profile 320 such that the second power plant 150 is 70% reliable. This makes the first power plant 140 and the second power plant 150 cheaper to construct than if they were both 83% reliable. The combined REPP output 410 may satisfy the combined power delivery profile 420 83% percent of the time such that the REPP output 410 is 83% percent reliable as required by the first load 110 and the second load 120.

In some embodiments, the combined REPP output 410 is a combination of outputs of a plurality of REPPs. The plurality of REPPs may include any number of REPPs. The greater the number of the plurality of REPPs and the less correlated the outputs of the REPPs are, the more reliable the combined REPP output 410 is likely to be. Additionally and/or alternatively, the greater the number of the plurality of REPPs and the less correlated the outputs of the REPPs are, the less excess power capacity each REPP requires for the combined REPP output 410 to be reliable. For example, the first power plant 140 may be built such that the first REPP output 210 cannot satisfy the first power delivery profile of the first load 110 above a first threshold reliability and the second power plant 150 may be built such that the second REPP output 310 cannot satisfy the second power delivery profile of the second load 120 above a second threshold reliability, but the combined REPP output 410 can still satisfy the first and second power delivery profiles above the first and second threshold reliabilities.

The above description discusses networking power plants to aggregate their output, and the same approach may be used to aggregate energy storage capacity. For example, a first energy storage system (ESS) may be sized to ensure that it can provide energy storage capacity given fluctuating demand for energy storage capacity. The first ESS may have storage capacity in excess of what is regularly expected to be required to account for large fluctuations in demand for energy storage capacity. Combining the energy storage capacity of the first ESS with the energy storage capacity of a second ESS may carry advantages similar to the advantages of combining outputs of REPPs. The combined energy storage capacity may be able to satisfy energy storage requirements more reliably than the energy storage capacity of the ESS and the energy storage capacity of the second ESS. The energy storage capacity of each of the first and second ESSs may be reduced, lowering cost, while maintaining reliability of satisfying energy storage requirements by using the combined energy storage capacity. The combined energy storage capacity in excess of requirements may be used as a virtual ESS. The virtual ESS may provide energy storage capacity to store energy from additional sources.

In an example, a first battery energy storage system (BESS) may have a first energy storage capacity and a second BESS may have a second energy storage capacity. A first power plant may have first energy storage requirements and a second power plant may have second energy storage requirements. Networking the first BESS and the second BESS may allow the first BESS and the second BESS to more reliably satisfy the first and second energy storage requirements of the first and second power plants. Alternatively, the first and second BESSs may be smaller and/or cheaper and still satisfy the first and second energy storage requirements of the first and second power plants at an acceptable reliability. A plurality of BESSs may be networked to amplify these advantages.

In another example, first and second BESSs may draw power from the grid and transfer power to the grid. The first and second BESSs may draw power from the grid when power is less expensive and transfer power to the grid when power is more expensive. Networking the first and second BESSs as disclosed herein may allow the first and second BESSs to absorb spikes of power when power is less expensive to sell when power is more expensive. Networking the first BESS and the second BESS may allow the first BESS and the second BESS to capture larger spikes of power than would be possible if not networked. Alternatively, the first and second BESSs may be smaller and/or cheaper and still capture larger spikes of power than would be possible if not networked. A plurality of BESSs may be networked to amplify these advantages.

The above description discusses networking power plants to aggregate their output, and the same approach may be used to aggregate power capacity. Operators of loads or grids may want to contract for power capacity, the ability to deliver an amount of renewable power, whether the power is ultimately delivered or not. For example, a load operator may contract for power capacity to cover a spike in power demand at the load. The power capacity is reserved for the load, and if the spike in demand occurs, the power capacity is utilized to deliver power to the load. If the spike in demand does not occur, the power capacity is not utilized to deliver power to the load. REPPs may be able to provide power capacity subject to fluctuations due to time of day, weather conditions, state of charge of energy storage systems, and other factors. For example, a first REPP may be sized to ensure that it can provide power capacity given fluctuating demand for power capacity. The first REPP may have power capacity in excess of what is regularly expected to be required in order to account for fluctuations in power capacity. Combining the power capacity of the first REPP with the power capacity of a second REPP may carry advantages similar to the advantages of combining outputs of REPPs. The combined power capacity may be able to satisfy power capacity requirements more reliably than the power capacity of the first REPP and the power capacity of the second REPP. The power capacity of each of the first and second REPPs may be reduced, lowering cost, while maintaining reliability of satisfying power capacity requirements by using the combined power capacity. The combined power capacity in excess of requirements may be used as a virtual REPP. The virtual REPP may provide power capacity to additional loads, grids, or other customers.

Figure 5:
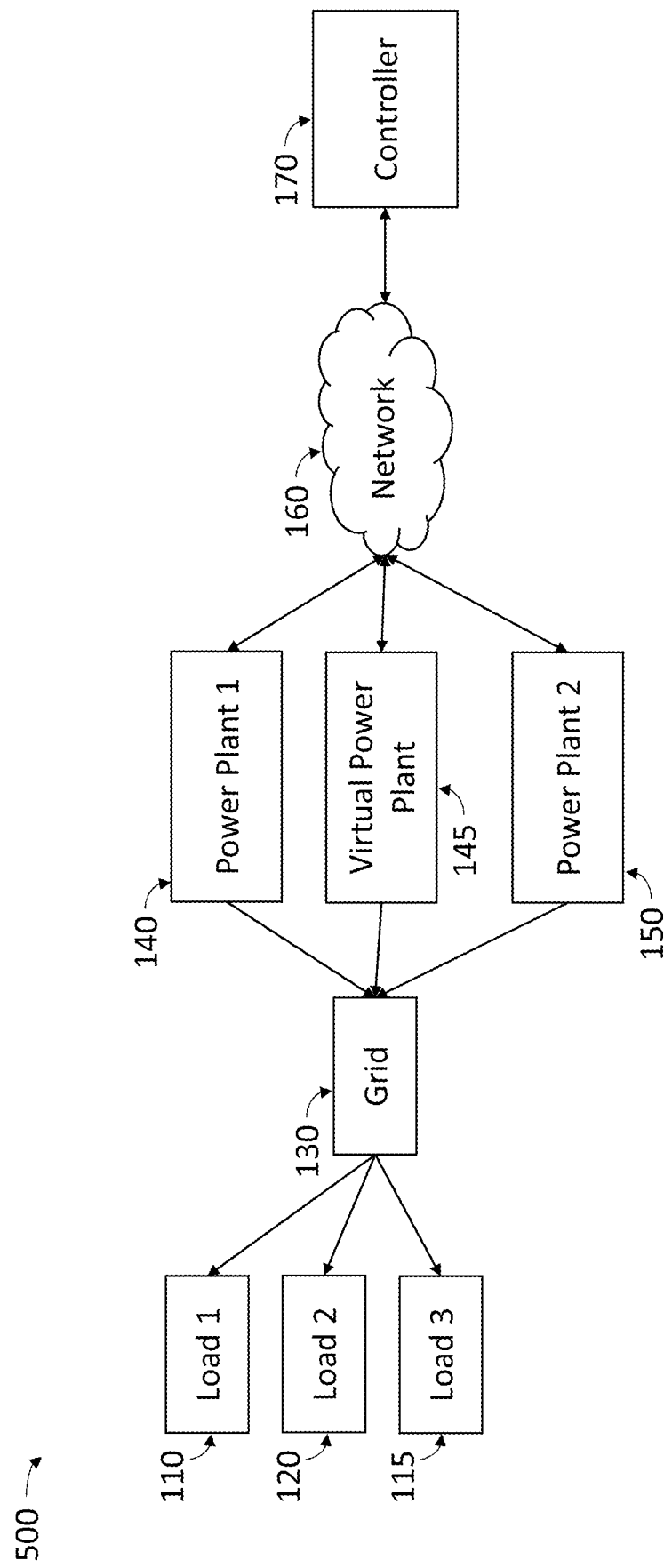
FIG. 5 illustrates another example environment in accordance with one or more embodiments.

FIG. 5 illustrates another example environment 500 in accordance with one or more embodiments. The environment 500 may include a first load 110, a second load 120, and a third load 115. The environment 500 may include a grid 130, a first power plant 140, a second power plant 150, a virtual power plant 145, a network 160, and a controller 170.

The first load 110, the second load 120, and the third load 115 may be electrically coupled to the grid 130. The first load 110, the second load 120, and the third load 115 may be remote from each other and have separate power requirements. The first load 110 may have a first power delivery profile which details power requirements for the first load 110 at different times. The second load 120 may have a second power delivery profile which details power requirements for the second load 120 at different times. The third load 115 may have a third power delivery profile which details power requirements for the third load 115 at different times. In some embodiments, the grid 130 may be a utility grid owned and operated by a single utility or system operator. In other embodiments, the grid 130 may be a plurality of electrical connections allowing for the transmission of power from the first power plant 140 and the second power plant 150 to the first load 110 and the second load 120.

The first power plant 140 may be a first renewable energy power plant (REPP). The second power plant 150 may be a second REPP. The virtual power plant 145 may represent power generated by the first power plant 140 and the second power plant 150 in excess of power requirements. This excess power may be allocated to different loads, functioning as the virtual power plant 145. For example, the first power plant 140 may deliver power to satisfy the first power delivery profile, the second power plant 150 may deliver power to satisfy the second power delivery profile, and the excess combined power output of the first power plant 140 and the second power plant 150 may serve as the virtual power plant 145 and be allocated to the third load 115 to satisfy the third power delivery profile. The first power plant 140 may have a first power output that varies over time. The second power plant 150 may have a second power output that varies over time. The virtual power plant 145 may have a third power output that varies over time dependent upon the first power output, the second power output, and power requirements imposed upon the first power plant 140 and the second power plant 150. The first power output and the second power output may vary differently such that they are not tightly correlated. For example, the first power plant 140 may be geographically remote from the second power plant 150 such that weather patterns at the first power plant 140 differ from weather patterns at the second power plant 150. Thus, variation in the first power output will not be correlated with variation in the second power output.

The less correlated the output of the first power plant 140 with the output of the second power plant 150, the greater the effects of networking. The less correlated the outputs of the first power plant 140 and the second power plant 150, the less variation will be present in the combined output of the first power plant 140 and the second power plant 150. Less variation in the combined output may result in more reliability in satisfying the power delivery profiles of the first load 110 and the second load 120. Less variation in the combined output may result in lower capacity requirements for the first power plant 140 and the second power plant 150. Less variation in the combined output may result in greater output of the virtual power plant 145.

Similar network advantages may be realized by selecting loads with power requirements that are not tightly correlated. For example, a combined power delivery profile of two loads will have less variability than the individual power delivery profiles of the two loads if the individual power delivery profiles are not tightly correlated. Less variability in the combined power delivery profile allows for the combined power delivery profile to be served by a power plant or network of power plants having less excess capacity. Less variability in the combined power delivery profile allows for a virtual power plant of a network of power plants to have greater output.

The first power plant 140 and the second power plant 150 may communicate with a controller 170 via a network 160. Since the virtual power plant 145 represents excess power output by the first power plant 140 and the second power plant 150, the controller communicates with the virtual power plant 170 by communicating with the first power plant 140 and the second power plant 150. The network 160 may be any local area network (LAN) or wide area network (WAN). In some embodiments, the network is the internet. In other embodiments, the network is a private communications network.

The controller 170 may control the first power plant 140, the second power plant 150, and the virtual power plant 145. The controller 170 may coordinate the first power output of the first power plant 140, the second power output of the second power plant 150, and the third output of the virtual power plant 145 in order to deliver power to the first load 110, the second load 120, and the third load 115. The controller 170 may receive the first power delivery profile of the first load 110, the second power delivery profile of the second load 120, and the third power delivery profile of the third load 115. In some embodiments, the controller 170 receives the first power delivery profile from the first load 110, the second power delivery profile from the second load 120, and the third power delivery profile from the third load 115 via the network 160. In other embodiments, the controller 170 receives the first power delivery profile, the second power delivery profile, and the third power delivery profile from another source. The controller 170 may direct the first power plant 140 to direct power to the first load 110 or the second load 120. The controller 170 may direct the second power plant 150 to direct power to the first load 110 or the second load 120. The controller 170 may direct the first power plant 140 to direct a first portion of its power output to the first load 110 and a second portion of its power output to the second load 120. The controller 170 may direct the second power plant 150 to direct a third portion of its power output to the first load 110 and a fourth portion of its power output to the second load 120. The controller 170 may direct the virtual power plant 145 to direct its power output to the third load.

The controller 170 may direct the first power plant 140 and the second power plant 150 to direct power to the first load 110 and the second load 120 to satisfy the first power delivery profile and the second power delivery profile. If the power output of the first power plant 140 is sufficient to satisfy the first power delivery profile of the first load 110 and the power output of the second power plant 150 is sufficient to satisfy the second power delivery profile of the second load 120, the controller 170 may direct the first power plant 140 to direct sufficient power to the first load 110 to satisfy the first power delivery profile and direct the second power plant 150 to direct sufficient power to the second load 120 to satisfy the second power delivery profile. If the power output of the first power plant 140 is insufficient to satisfy the first power delivery profile of the first load 110 and the power output of the second power plant 150 is sufficient to satisfy the second power delivery profile of the second load 120, the controller 170 may direct the first power plant 140 to direct its power output to the first load 110 and direct the second power plant 150 to direct sufficient power to the second load 120 to satisfy the second power delivery profile and an amount of power to the first load 110 sufficient, when combined with the power output of the first power plant 140, to satisfy the first power delivery profile of the first load 110. Since the power outputs of the first power plant 140 and the second power plant 150 are not tightly correlated, it is likely that if the power output of the first power plant 140 is insufficient to satisfy the first power delivery profile, the second power plant 150 has sufficient power output in excess of what is require by the second power delivery profile to supplement the power output of the first power plant 140 to satisfy the first power delivery profile.

The combined power output of the first power plant 140 and the second power plant 150 which exceeds the first power delivery profile and the second power delivery profile may be directed by the controller 170 from the virtual power plant 145 to satisfy the third power delivery profile of the third load 115. If the combined power output of the first power plant 140 and the second power plant 150 does not exceed the combination of the first power delivery profile and the second power delivery profile, no power may be directed to satisfy the third power delivery profile.

In some embodiments, the first power plant 140 and the second power plant 150 may be selected to be networked. The first power plant 140 and the second power plant 150 may be selected for networking based on a level of correlation between the first power output and the second power output. The first power plant 140 and the second power plant 150 may be selected for networking based on a determination that the first power output and the second power output are the least correlated of a plurality of power outputs of a plurality of power plants. In some embodiments, the first power output is compared to a plurality of power outputs to select the second power output which is the least correlated with the first power output of the plurality of power outputs. In other embodiments, the first power plant 140 and the second power plant 150 may be selected by optimizing for minimized correlation from a plurality of power plants. The controller 170 may select the first power plant 140 and the second power plant 150.

Figure 6:
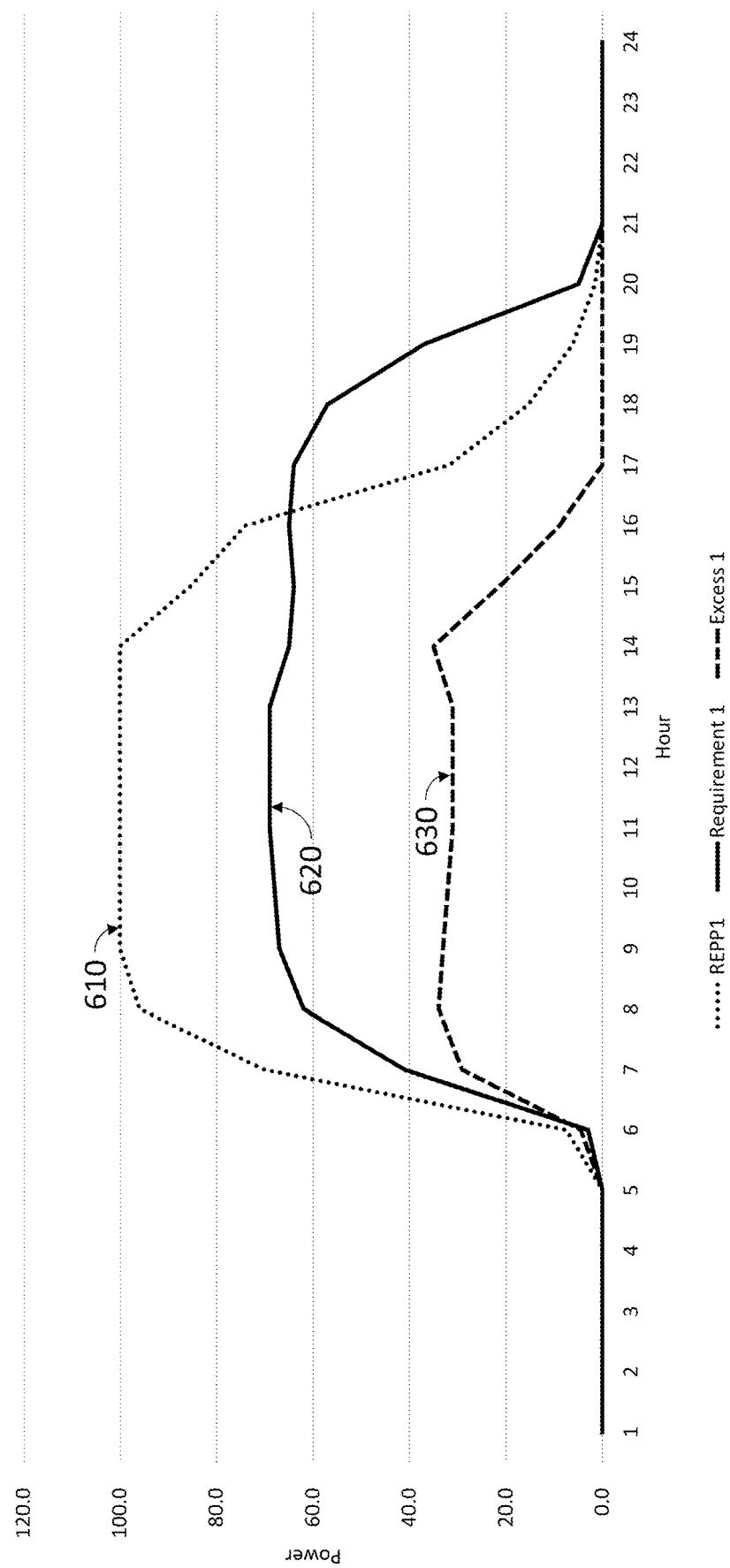
FIG. 6 illustrates a first REPP output, a first power delivery profile, and a first excess output.

FIG. 6 illustrates a first REPP output 610, a first power delivery profile 620, and a first excess output 630. The first REPP output 610 may be the first REPP output of the first power plant 140 of FIG. 5. The first delivery profile 620 may be the first power delivery profile of the first load 110 of FIG. 5. The first excess output 630 may be the excess of the first REPP output 610 over the first power delivery profile 620. The first REPP output 610 is shown by the dotted line, the first power delivery profile 620 is shown by the solid line, and the first excess output 630 is shown by the dashed line.

Figure 7:
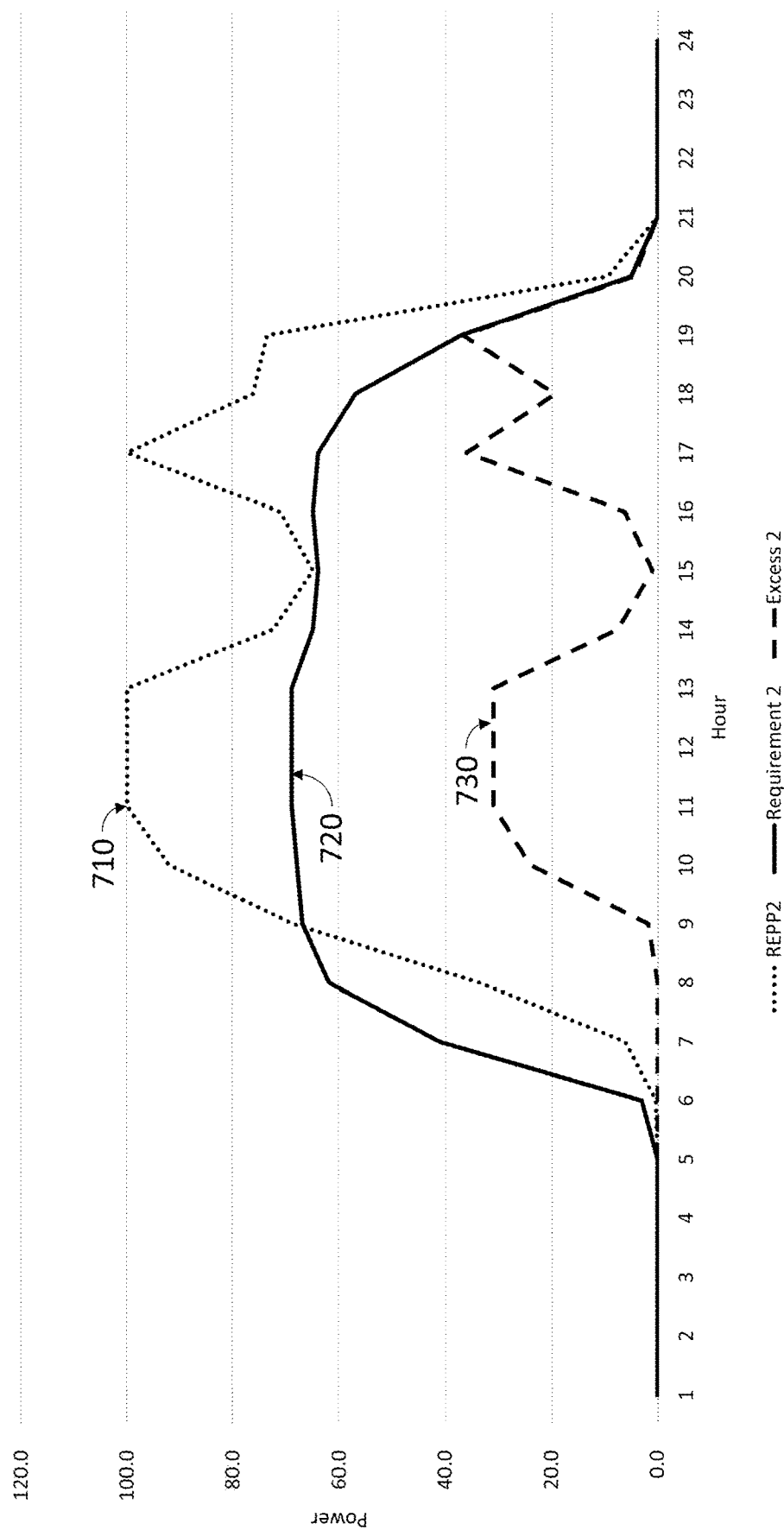
FIG. 7 illustrates a second REPP output, a second power delivery profile, and a second excess output.

FIG. 7 illustrates a second REPP output 710, a second power delivery profile 720, and a second excess output 730. The first REPP output 710 may be the second REPP output of the second power plant 150 of FIG. 5. The second delivery profile 720 may be the second power delivery profile of the second load 120 of FIG. 5. The second excess output 630 may be the excess of the second REPP output 710 over the second power delivery profile 720. The second REPP output 710 is shown by the dotted line, the second power delivery profile 720 is shown by the solid line, and the second excess output 730 is shown by the dashed line. The second delivery profile 720 is shown as being the same as the first delivery profile 620 of FIG. 6, but the first delivery profile 620 and the second delivery profile 720 may be different.

Figure 8:
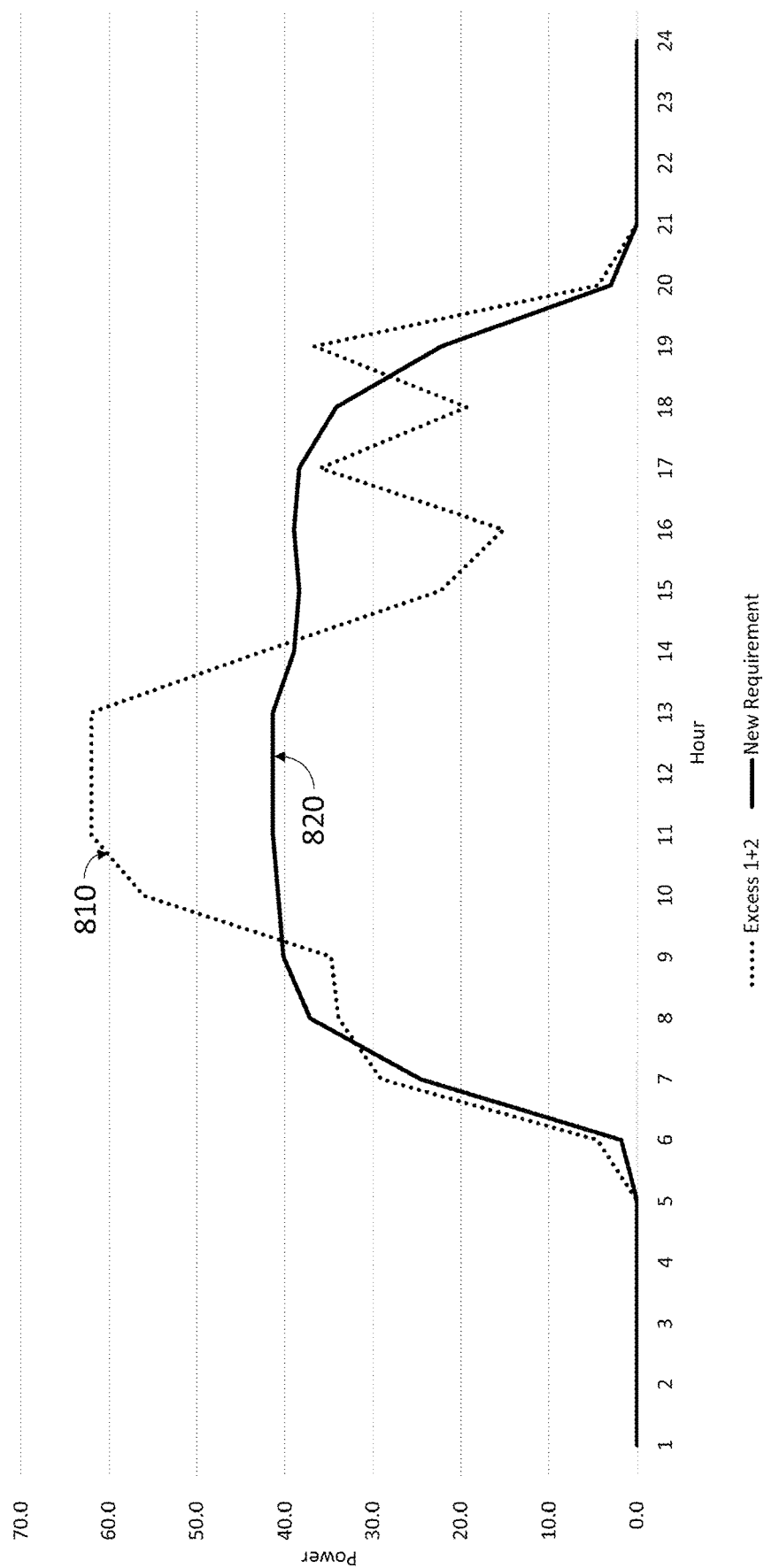
FIG. 8 illustrates a combined excess output and a third delivery profile.

FIG. 8 illustrates a combined excess output 810 and a third power delivery profile 820. The combined excess output 810 may be a combination of the first excess output 630 of FIG. 6 and the second excess output 730 of FIG. 7. The combined excess output 810 may be the output of the virtual power plant 145 of FIG. 5. The third power delivery profile 820 may be the third power delivery profile of the third load 115 of FIG. 5. In some embodiments, the third power delivery profile 820 represents the power requirements of the third load 115. In other embodiments, the third power delivery profile 820 represents renewable power requested by the third load 115. The third power delivery profile 820 may be smaller than the first power delivery profile 620 and the second power delivery profile 720. The third power delivery profile 820 may be based on an expected combined excess output 810. The combined excess output 810 may be less reliable than the first REPP output 610 and the second REPP output 710. In some embodiments, the combined excess output 810 may be directed to more than one load and the third power delivery profile 820 may represent a combination of power delivery profiles of various loads.

In some embodiments, the combined excess output 810 is a combination of excess outputs of a plurality of REPPs. The plurality of REPPs may include any number of REPPs. The greater the number of the plurality of REPPs and the less correlated the outputs of the REPPs are, the greater the output and the greater the reliability of the combined excess output 810. Additionally and/or alternatively, the greater the number of the plurality of REPPs and the less correlated the outputs of the REPPs are, the less excess capacity each REPP requires for the combined excess output 810 to be reliable.

Figure 9:
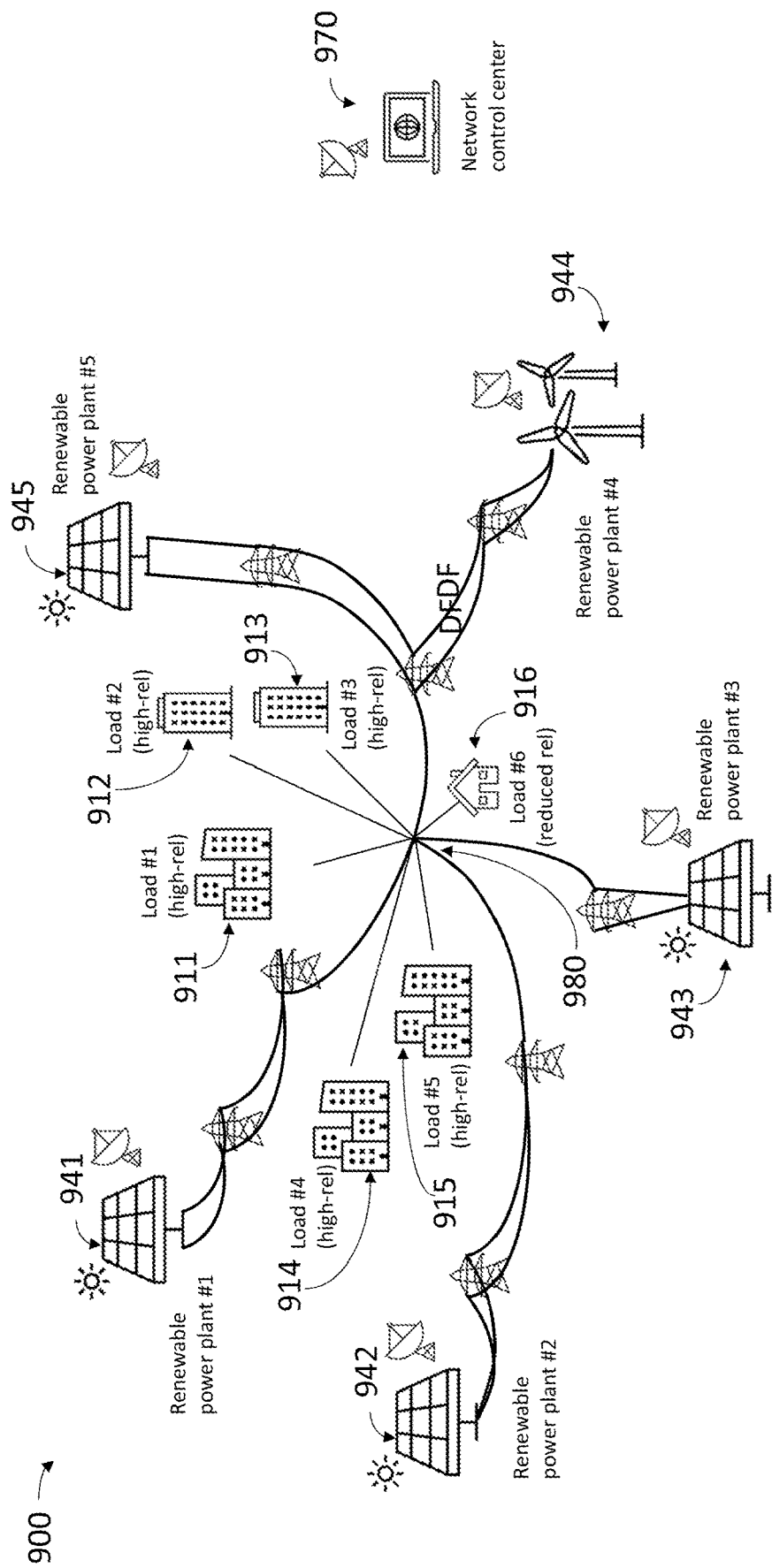
FIG. 9 illustrates another example environment in accordance with one or more embodiments.

FIG. 9 illustrates another example environment 900 in accordance with one or more embodiments. The environment 900 may include a first REPP 941, a second REPP 942, a third REPP 943, a fourth REPP 944, and a fifth REPP 945. The first REPP 941, the second REPP 942, the third REPP 943, and the fifth REPP 945 may be solar power plants and the fourth REPP 944 may be a wind power plant. The REPPs may be in distinct geographical locations and be remote from each other. The outputs of the REPPs may not be tightly correlated. The REPPs may communicate with a controller 970 via a network. The controller 970 may be the controller 170 or play a similar role as the controller 170 of FIG. 5.

The environment 900 may include a first load 911, a second load 912, a third load 913, a fourth load 914, a fifth load 915, and a sixth load 916. The first load 911, the second load 912, the third load 913, the fourth load 914, and the fifth load 915 may be high-reliability loads, such that they require reliable delivery of renewable power. The high-reliability loads may require renewable energy equal to their power requirements or equal to a portion of their power requirements with a reliability above a threshold reliability. The environment 900 may include a sixth load 916. The sixth load 916 may be a low-reliability load, such that it does not require reliable delivery of renewable power. Low-reliability loads may utilize renewable power when it is available and power from other sources when renewable power is not available. The first load 911, the second load 912, the third load 913, the fourth load 914, the fifth load 915, and the sixth load 916 may be electrically coupled to the first REPP 941, the second REPP 942, the third REPP 943, the fourth REPP 944, and the fifth REPP 945 via a grid 980. The grid 980 may be electrically coupled to additional power sources and loads.

In some embodiments, the controller 970 may determine power output setpoints for the REPPs 941-945. Setting the power outputs for the REPPs 941-945 may include receiving a first signal indicating the power delivery profile for the first load 911 and determining setpoints for the REPPs 941-945 such that the combined power output of the REPPs 941-945 is sufficient to satisfy the power delivery profile of the first load 911. The controller 970 may receive a second signal indicating the power delivery profile for the second load 912 and determine setpoints for the REPPs 941-945 such that the combined power output of the REPPs 941-945 is sufficient to satisfy the power delivery profiles of the first load 911 and the second load 912. The controller 970 may receive a signal from each of the loads 911-916 and determine setpoints for the REPPs 941-945 such that the combined power output of the REPPs 941-945 is sufficient to satisfy the power delivery profiles of the loads 911-916.

The REPPs may be networked as discussed herein such that a combined excess output of the REPPs in excess of the requirements of the high-reliability loads functions as a virtual power plant. The virtual power plant may direct power to the sixth load 916.

In an example, if the combined output of the REPPs 941-945 is more than the sum of power delivery profiles of loads 911-916, the controller 970 may set power outputs for the REPPs 941-945 equal to a combined power delivery profile of the loads 911-916. The controller 970 may notify the loads 911-916 that the power delivered to the loads 911-916 from the REPPs 941-945 via the grid was sufficient to satisfy their power delivery profiles.

In another example, if the combined output of the REPPs 941-945 is more than the sum of the power delivery profiles of the loads 911-915, but not more than the sum of the power delivery profiles of the loads 911-916, the controller 970 may set power outputs for the REPPs 941-945 equal to maximum current power outputs for the REPPs 941-945. The controller 970 may allocate power to the loads 911-915 sufficient to satisfy their power delivery profiles and notifies the loads 911-915 that the power delivered to the loads 911-915 was sufficient to satisfy their power delivery profiles. The controller 970 may allocate a remainder of the combined output of the REPPs 941-945 to the sixth load 916 and notifies the sixth load 916 of an amount of the remainder of the combined output of the REPPs 941-945 which was delivered to the sixth load 916.

In yet another example, if the combined output of the REPPs 941-945 is less than the sum of the power delivery profiles of loads 911-915, the controller 970 may set power outputs for the REPPs 941-945 equal to maximum current power outputs for the REPPs 941-945. The controller 970 may allocate power to the loads 911-915 and notify the loads 911-915 of amounts of power delivered to the loads 911-915 and whether the amounts of power delivered to the loads 911-915 were sufficient to satisfy their power delivery profiles. The controller 970 may notify the sixth load 916 that no power was delivered to the sixth load 916 from the REPPs 941-945.

Figure 10:
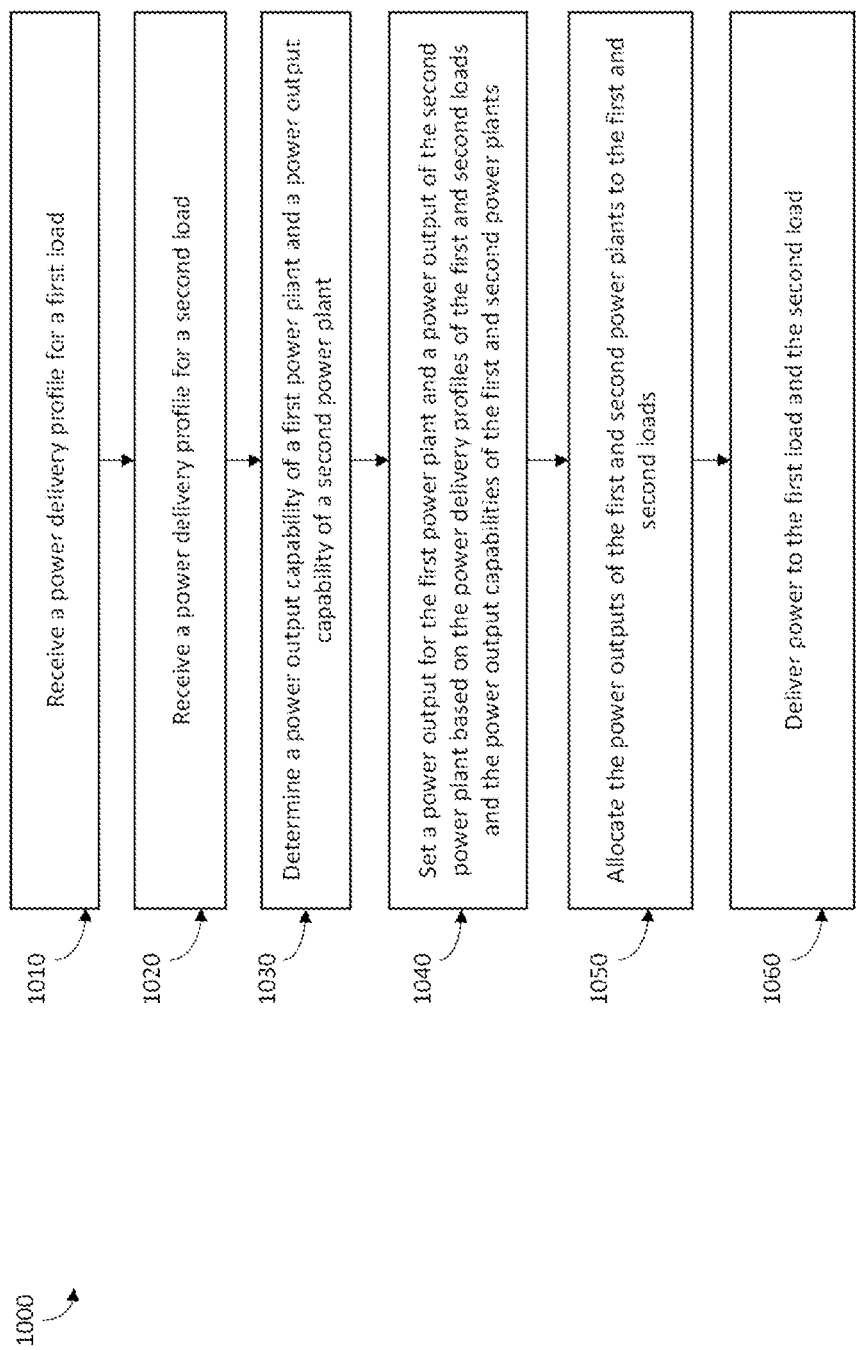
FIG. 10 is a flowchart of an example method for allocating power from networked power plants in accordance with one or more embodiments.

FIG. 10 is a flowchart of an example method 1000 for allocating power from networked power plants in accordance with one or more embodiments. Additional, fewer, or different operations may be performed in the method, depending on the embodiment. Further, the operations may be performed in the order shown, concurrently, or in a different order.

At 1010, a controller receives a first power delivery profile for a first load. The controller may store the first power delivery profile in a memory of the controller. The power delivery profile may represent a request for amounts of power at different times. For example, a load desiring to use only renewable energy may have a power delivery profile equal to its power requirements. At 1020, the controller receives a second power delivery profile for a second load. The controller may store the second power delivery profile in the memory. The second power delivery profile may be the same or different from the first power delivery profile. At 1030, the controller may determine a power output capability of a first power plant and a power output capability of a second power plant. The first power plant and the second power plant may be renewable energy power plants (REPPs). The controller may store the power output capabilities of the first and second power plants in the memory. Determining the power output capabilities of the first and second power plants may include receiving an indication of the power output capabilities of the first and second power plants via a network. In some embodiments, the power output capabilities of the first and second power plants may be predictions of power outputs of the first and second power plants. In other embodiments, the power output capabilities of the first and second power plants may be current maximum output capabilities of the first and second power plants.

At 1040, the controller sets a first power output for the first power plant and a second power output for the second power plant based on the power delivery profiles of the first and second loads and the power output capabilities of the first and second power plants. Setting the first and second power outputs may include determining a combined power output capability of the first and second power plants and a combined power delivery profile of the first and second loads. The controller may determine whether the combined power output capability is sufficient to satisfy the combined power delivery profile. The controller may compare the combined power output capability to the combined power delivery profile and determine points where the combined power output capability exceeds the combined power delivery profile. The controller may set the first power output and the second power output such that the combined power output satisfies the combined power delivery profile. Setting the first power output and the second power output may include sending an indication to the first and second power plants of power output levels at different times. For example, if the power output capability of the first power plant exceeds the first power delivery profile by an amount sufficient to compensate for a deficiency in the power output capability of the second power plant, the controller will set the second power output to a maximum possible amount and the first power output to an amount sufficient to satisfy the first power delivery profile and the second power delivery profile when combined with the second power output. In some embodiments, the controller may set the power outputs of the first and second power plants in real time. In other embodiments, the controller may set the power outputs of the first and second power plants for a time period.

At 1050, the controller allocates the power outputs of the first and second power plants to the first and second loads. In some embodiments, allocating the power outputs of the first and second power plants to the first and second loads includes notifying the first load of a first amount of power allocated to the first load and whether the first amount of power is sufficient to satisfy the first power delivery profile and notifying the second load of a second amount of power allocated to the second load and whether the second amount of power is sufficient to satisfy the second power delivery profile.

At 1060, power is delivered to the first load and the second load. The controller may direct the first power plant and the second power plant to deliver the allocated power outputs to the first and second loads. The first and second power plants may deliver the allocated power outputs to the first and second loads via a grid. In some embodiments, delivering the power outputs of the first and second power plants to the first and second loads includes notifying the first load of a first amount of power delivered to the first load and whether the first amount of power is sufficient to satisfy the first power delivery profile and notifying the second load of a second amount of power delivered to the second load and whether the second amount of power is sufficient to satisfy the second power delivery profile.

Figure 11:
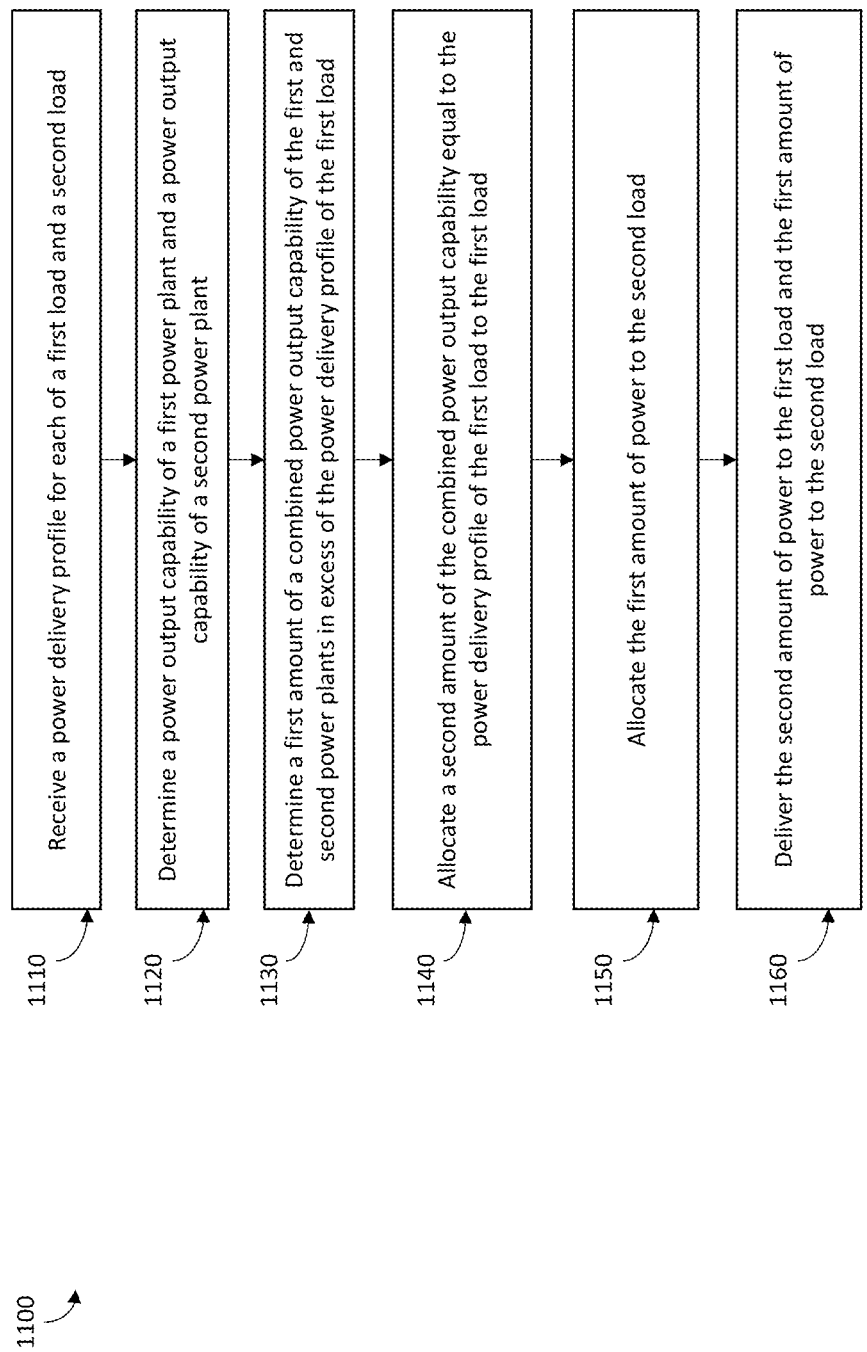
FIG. 11 is a flowchart of an example method for delivering power using a virtual power plant in accordance with one or more embodiments.

FIG. 11 is a flowchart of an example method 1100 for delivering power using a virtual power plant in accordance with one or more embodiments. Additional, fewer, or different operations may be performed in the method, depending on the embodiment. Further, the operations may be performed in the order shown, concurrently, or in a different order.

At 1110, a controller receives a power delivery profile for each of a first load and a second load. The power delivery profile for each load may represent a request for amounts of power at different times. For example, a load desiring to use only renewable energy may have a power delivery profile equal to its power requirements. The controller may store the power delivery profile of the first and second load in a memory of the controller. At 1120, the controller determines a power output capability of a first power plant and a power output capability of a second power plant. The first power plant and the second power plant may be renewable energy power plants (REPPs). Determining the power output capabilities of the first and second power plants may include receiving an indication of the power output capabilities of the first and second power plants via a network. In some embodiments, the power output capabilities of the first and second power plants may be predictions of power outputs of the first and second power plants. In other embodiments, the power output capabilities may of the first and second power plants may be current maximum output capabilities of the first and second power plants. The controller may store the power output capabilities of the first and second power plants in the memory.

At 1130, the controller determines a first amount of a combined power output capability of the first and second power plants in excess of the power delivery profile of the first load. Determining the first amount of the combined power output capability may include combining the power output capabilities of the first and second power plants to obtain the combined power output capability and comparing, using a processor of the controller, the combined power output capability to the power delivery profile of the first load. Power that is not needed to satisfy the power delivery profile of the first load is power produced in excess of the power delivery profile of the first load. The excess power output may be treated as a virtual power plant which may direct power to loads. The controller may store an indication of the excess power output in the memory. At 1140, the controller allocates a second amount of the combined output capability equal to the power delivery profile of the first load to the first load. In some embodiments, allocating the second amount of power to the first load includes notifying, by the controller, the first load of the amount of power allocated to the first load. The controller allocates sufficient power to the first load to satisfy the power delivery profile of the first load. At 1150, the controller allocates the first amount of power to the second load. In some embodiments, allocating the first amount of power to the second load includes notifying, by the controller, the second load of the amount of power allocated to the second load.

At 1160, the controller directs the first and second power plants to deliver the second amount of power to the first load and the first amount of power to the second load. In some embodiments, the controller directs the virtual power plant representing the excess power of the combined output capability to direct the first amount of power to the second load. The controller may direct the first, second, and virtual power plants via a network. The first, second, and virtual power plants may deliver power via a grid. In some embodiments, delivering the first amount of power to the second load includes notifying, by the controller, the second load of the amount of power allocated to the second load. In some embodiments, delivering the second amount of power to the first load includes notifying, by the controller, the first load of the amount of power allocated to the first load.

The embodiments disclosed herein represent various technical improvements. The specific implementation of setting power outputs of REPPs based on power delivery profiles and allocating power outputs to different loads is a solution to problems in delivering renewable energy over a grid. Previous methods for delivering renewable energy required local power generation and direct transmission of power from the REPP to the load. Connecting a load to a grid did not allow for the use of purely renewable energy because renewable power and non-renewable power are commingled on the grid. To deliver renewable power over a grid required an REPP to deliver an amount of power to the grid and allocate its output to a load, which would draw power from the grid equal to the amount of power delivered to the grid by the REPP. The REPP, due to fluctuations in power generation, would have to be oversized relative to power requirements of the load in order to reliably satisfy the power requirements. In contrast, the embodiments discussed herein offer the technical improvement of more efficiently allocating specific power outputs of networked REPPs to specific loads in order to more reliably and more efficiently satisfy the power requirements of the specific loads. More efficiently allocating the specific power outputs of networked REPPs to specific loads in order to satisfy the power requirements of the specific loads is a practical application that lowers construction and maintenance costs of the networked power plants. The embodiments discussed herein offer the technical improvement of allocating a combined power output of REPPs to specific loads to more reliably and efficiently satisfy the power requirements of the specific loads. Allocations of specific power outputs to specific loads may be stored in the memory of the controller. The controller may communicate the allocations to the loads over the network. The embodiments herein also provide for the practical application of providing energy products such as energy storage and power capacity associated with particular loads, power sources, and attributes. For example, the technical improvement of allocating specific power output of a specific REPP to a specific load allows that specific power output to be tracked and delivered to the specific load.

The technical improvement of more efficiently allocating outputs of REPPs to loads provides for the practical application of an operator of multiple REPPs contracting with loads for the delivery of power. Instead of each operator of individual REPPs contracting to sell an amount of power allocated to a load, the operator of multiple REPPs can contract to sell a combined output of the multiple REPPs allocated to multiple loads. This results in more reliable delivery of renewable power as the combined output has less variability than outputs of individual REPPs. These technical improvements allow for greater flexibility and user customization in contracting for power than previous systems and methods.

Networking power plants to combine their outputs bears significant advantages over conventional systems. Networking power plants to combine their outputs provides the technical improvement of greater reliability of power output. Networking power plants improves the functioning of power plants by reducing the strain of power output fluctuations on individual plants. Networking power plants provides the technical improvement of allowing individual power plants to be built with less excess power output capacity. The practical application of this technical improvement is in reducing the cost of renewable power by building smaller REPPs with less excess power output capacity over power requirements. Networking power plants provides the technical improvement of utilizing excess combined power output as a virtual power plant. This has the practical application of providing renewable power to additional loads using excess power output that would not otherwise be delivered to a load.

In an illustrative embodiment, any of the operations described herein can be implemented at least in part as computer-readable instructions stored on a computer-readable memory. Upon execution of the computer-readable instructions by a processor, the computer-readable instructions can cause a node, such as a computing node or a power plant node, to perform the operations.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "similar," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:
   determining a power output capability of a first renewable energy power plant (REPP);
   determining a power output capability of a second REPP;
   allocating a combined power output of the first and second REPPs to the first and second loads for a time window;
   transmitting, via a communication network, a first indication of a first portion of the combined power output of the first and second REPPs for the time window to the first load and a second indication of a second portion of the combined output for the time window to the second load, wherein there are times when the first load consumes more energy than indicated in the first indication where the first load consumes energy produced from sources other than the first and second REPPs in addition to energy consumed as indicated by the first indication from the combined power output of the first and second REPPs; and
   when the first load consumes more energy than indicated in the first indication, recording (i) the first portion of the combined power output of the first and second REPPS of the first indication consumed by the first load, and (ii) a third portion of energy from the sources other than the first and second REPPs consumed by the first load, respectively, via a grid during the time window.

2. The method of claim 1, further comprising:
   delivering the allocated combined power output to the grid.

3. The method of claim 1, further comprising:
   setting a first power output for the first REPP; and
   setting a second power output for the second REPP.

4. The method of claim 3, wherein setting the first power output comprises setting the first power output based on a first request for power from a first load, and wherein setting the second power output comprises setting the second power output based on a second request for power from a second load.

5. The method of claim 4, wherein the first request for power comprises a power delivery profile of the first load, and wherein the second request for power comprises a power delivery profile of the second load.

6. The method of claim 1, further comprising selecting the first REPP and the second REPP based on a level of correlation between the power output capability of the first REPP and the power output capability of the second REPP.

7. The method of claim 6, wherein the power output capability of the first REPP is a prediction of a first REPP power output, and wherein the power output capability of the second REPP is a prediction of a second REPP power output.

8. A system comprising:
   a controller configured to:
   determine a power output capability of a first renewable energy power plant (REPP);
   determine a power output capability of a second REPP;
   allocate a combined power output of the first and second REPPs to the first and second loads for a time window;
   transmit, via a communication network, a first indication of a first portion of the combined power output of the first and second REPPs for the time window to the first load and a second indication of a second portion of the combined output for the time window to the second load, wherein there are times when the first load consumes more energy than indicated in the first indication where the first load consumes energy produced from sources other than the first and second REPPs in addition to energy consumed as indicated by the first indication from the combined power output of the first and second REPPs; and
   when the first load consumes more energy than indicated in the first indication, record (i) the first portion of the combined power output of the first and second REPPS of the first indication consumed by the first load, and (ii) a third portion of energy from the sources other than the first and second REPPs consumed by the first load, respectively, via a grid during the time window.

9. The system of claim 8, wherein the controller is further configured to:
   transmit an instruction to the first REPP and the second REPP to deliver the allocated combined power output to the grid.

10. The system of claim 8, wherein the controller is further configured to:
    set a first power output for the first REPP; and
    set a second power output for the second REPP.

11. The system of claim 10, wherein the controller is further configured to:
    set the first power output based on a first request for power from a first load; and
    set the second power output based on a second request for power from a second load.

12. The system of claim 11, wherein the first request for power comprises a power delivery profile of the first load, and wherein the second request for power comprises a power delivery profile of the second load.

13. The system of claim 8, wherein the controller is further configured to:
    select the first REPP and the second REPP based on a level of correlation between the power output capability of the first REPP and the power output capability of the second REPP.

14. The system of claim 8, wherein the power output capability of the first REPP is a prediction of a first REPP power output, and wherein the power output capability of the second REPP is a prediction of a second REPP power output.

15. A non-transitory computer-readable storage medium having instructions stored thereon that, upon execution by a processor, cause the processor to perform operations comprising:
    determining a power output capability of a first renewable energy power plant (REPP);
    determining a power output capability of a second REPP;

allocating a combined power output of the first and second REPPs to the first and second loads for a time window;

transmitting, via a communication network, a first indication of a first portion of the combined power output of the first REPP and the second REPP for the time window to the first load and a second indication of a second portion of the combined output for the time window to the second load, wherein there are times when the first load consumes more energy than indicated in the first indication where the first load consumes energy produced from sources other than the first and second REPPs in addition to energy consumed as indicated by the first indication from the combined power output of the first and second REPPs; and when the first load consumes more energy than indicated in the first indication, recording (i) the first portion of the combined power output of the first and second REPPS of the first indication consumed by the first load, and (ii) a third portion of energy from the sources other than the first and second REPPs consumed by the first load, respectively, via a grid during the time window.

16. The non-transitory, computer-readable storage medium of claim 15, wherein the operations further comprise:

delivering the allocated combined power output to the grid.

17. The non-transitory, computer-readable storage medium of claim 15, wherein the operations further comprise:

setting a first power output for the first REPP; and
setting a second power output for the second REPP.

18. The non-transitory, computer-readable storage medium of claim 17, wherein setting the first power output comprises setting the first power output based on a first request for power from a first load, and wherein setting the second power output comprises setting the second power output based on a second request for power from a second load.

19. The non-transitory, computer-readable storage medium of claim 18, wherein the first request for power comprises a power delivery profile of the first load, and wherein the second request for power comprises a power delivery profile of the second load.

20. The non-transitory, computer-readable storage medium of claim 15, wherein the operations further comprise:

selecting the first REPP and the second REPP based on a level of correlation between the power output capability of the first REPP and the power output capability of the second REPP.

21. The non-transitory, computer-readable storage medium of claim 20, wherein the power output capability of the first REPP is a prediction of a first REPP power output, and wherein the power output capability of the second REPP is a prediction of a second REPP power output.

* * * * *